United States Patent
Ozawa et al.

(10) Patent No.: US 7,413,351 B2
(45) Date of Patent: Aug. 19, 2008

(54) OPTICAL CONNECTION APPARATUS WHICH HAS A SHUTTER AND WHICH CAN BE DESIGNED TO BE SMALL IN SIZE

(75) Inventors: Kan Ozawa, Tokyo (JP); Yuichi Koreeda, Tokyo (JP)

(73) Assignee: Japan Aviation Electronics Industry Limited, Tokyo (JP)

( * ) Notice: Subject to any disclaimer, the term of this patent is extended or adjusted under 35 U.S.C. 154(b) by 0 days.

(21) Appl. No.: 11/588,613

(22) Filed: Oct. 27, 2006

(65) Prior Publication Data

US 2007/0098330 A1 May 3, 2007

(30) Foreign Application Priority Data

Oct. 27, 2005 (JP) ............................. 2005-312615

(51) Int. Cl.
*G02B 6/36* (2006.01)
(52) U.S. Cl. .......................................... 385/53; 385/75
(58) Field of Classification Search ................ None
See application file for complete search history.

(56) References Cited

U.S. PATENT DOCUMENTS 6,461,054 B1 * 10/2002 Iwase ........................ 385/73

FOREIGN PATENT DOCUMENTS

| EP | 0788002 | * | 1/1997 |
|---|---|---|---|
| EP | 0 788 002 A1 | | 8/1997 |
| JP | 9-211264 A | | 8/1997 |
| JP | 2002-055263 A | | 2/2002 |
| JP | 2003-139999 A | | 5/2003 |
| JP | 2005-17598 S | | 1/2005 |
| JP | 2005017598 A | * | 1/2005 |

* cited by examiner

*Primary Examiner*—Sung Pak
*Assistant Examiner*—Chad H Smith
(74) *Attorney, Agent, or Firm*—Frishauf, Holtz, Goodman & Chick, P.C.

(57) ABSTRACT

In an optical connection apparatus for use in optical connection, a shutter is held by a housing defining an optical axis of the optical connection. The shutter is formed by a single sheet of plate material and includes a plate-like light shielding portion positioned to cross the optical axis and a held portion held by the housing. The shielding portion has a width in a direction perpendicular to the optical axis. The held portion is shifted in position with respect to the light shielding portion in the direction of the width of the shielding portion.

12 Claims, 6 Drawing Sheets

OPTICAL CONNECTION APPARATUS WHICH HAS A SHUTTER AND WHICH CAN BE DESIGNED TO BE SMALL IN SIZE

This application claims priority to prior Japanese patent application JP 2005-312615, the disclosure of which is incorporated herein by reference.

BACKGROUND OF THE INVENTION

This invention relates to an optical connection apparatus having a shutter for shielding outgoing light and to the shutter. Herein, the term "optical connection apparatus" is used in a broad sense and includes not only a typical optical connector such as an optical plug and an optical receptacle but also a connection assisting element or device called an adapter or an optical adapter and frequently used for connection of the optical connector.

Generally, an optical connector is used for connection of an optical fiber defining an optical path of laser light. Therefore, in a connected state, the laser light does not leak out from the optical connector. However, in a disconnected state, the laser light may possibly be emitted outward from an open end of the optical connector as outgoing light.

In order to protect user's eyes from the outgoing light emitted from the optical connector, it is proposed to provide the optical connector with a shutter for shielding the outgoing light. For example, a manually operable shutter is disposed at an end face of an opening portion of an adapter attached to the optical connector. However, an operation of the shutter is troublesome. In addition, the number of parts, the cost, and the size are disadvantageously increased.

Japanese Unexamined Patent Application Publication (JP-A) No. 2003-139999 discloses the technique of shielding outgoing light from an optical connector by the use of a shutter. The shutter is formed by a thin plate material such as metal and has a flat insert portion. On the other hand, an adapter to be attached to the optical connector has an insertion grove formed on its end face. By inserting the insert portion into the insertion groove, the shutter is attached to the adapter. In the above-mentioned method of fixing the shutter, the insert portion is inserted into and fixed to the insertion groove by so-called press-fitting. Therefore, a special press-fit tool is required and a place of production is limited.

Japanese Unexamined Patent Application Publication (JP-A) No. 2005-17598 also discloses an optical connector with a shutter. In the optical connector, the shutter comprises a plate-like shutter portion for shielding light, and an anchor portion folded back from the shutter portion and adapted to be inserted into an anchor hole formed on a wall portion of a connector body to penetrate therethrough. The anchor portion has a stopper portion passing through the anchor hole and engaged with the wall portion to prevent the shutter from being released. However, since the shutter portion and the anchor portion are faced to each other in a height direction of the connector, i.e., the anchor portion is positioned exactly below the shutter portion, the connector can not be reduced in height. When the shutter is fixed to an optical adapter, a front end plate portion between the shutter portion and the anchor portion is pressed. Therefore, the shutter portion may be deformed during operation.

SUMMARY OF THE INVENTION

It is therefore an object of this invention to provide an optical connection apparatus which can be designed to be small in height although the optical connection apparatus has a shutter.

It is another object of this invention to provide an optical connector apparatus in which a shutter can easily be coupled thereto.

It is still another object of this invention to provide a shutter suitable for the above-mentioned optical connection apparatus.

Other objects of the present invention will become clear as the description proceeds.

According to an aspect of the present invention, there is provided a n optical connection apparatus for use in optical connection. The optical connection apparatus comprises a housing defining an optical axis of the optical connection and a shutter formed by a single sheet of plate material and held by the housing. The shutter includes a plate-like light shielding portion positioned to cross the optical axis and having a width in a direction perpendicular to the optical axis, and a held portion held by the housing and shifted in position with respect to the light shielding portion in the direction of the width.

DESCRIPTION OF THE PREFERRED EMBODIMENTS

Figure 1:
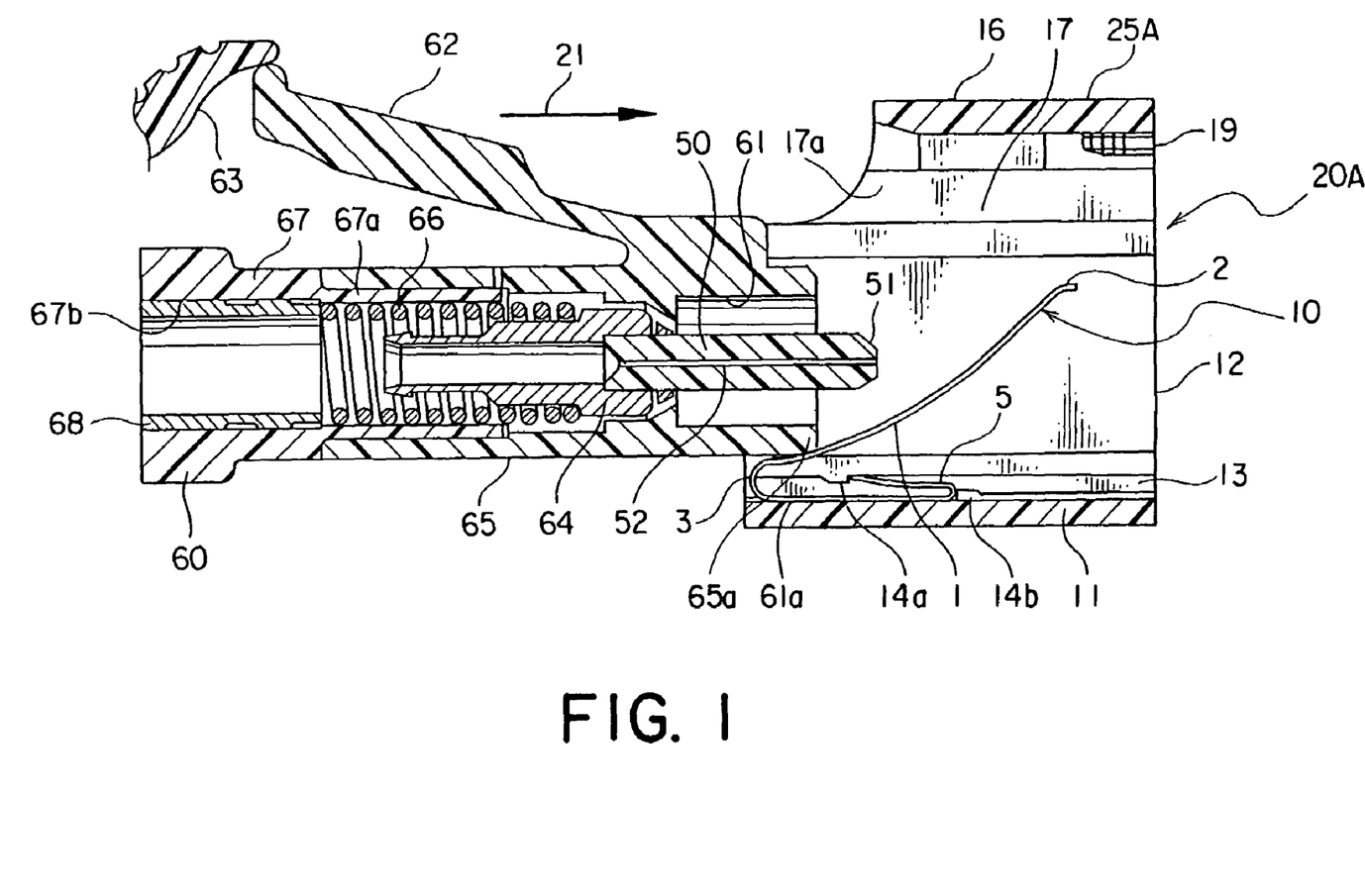
FIG. 1 is a sectional view showing an optical adapter as an optical connection apparatus according to an embodiment of this invention together with an optical plug.
Figure 2:
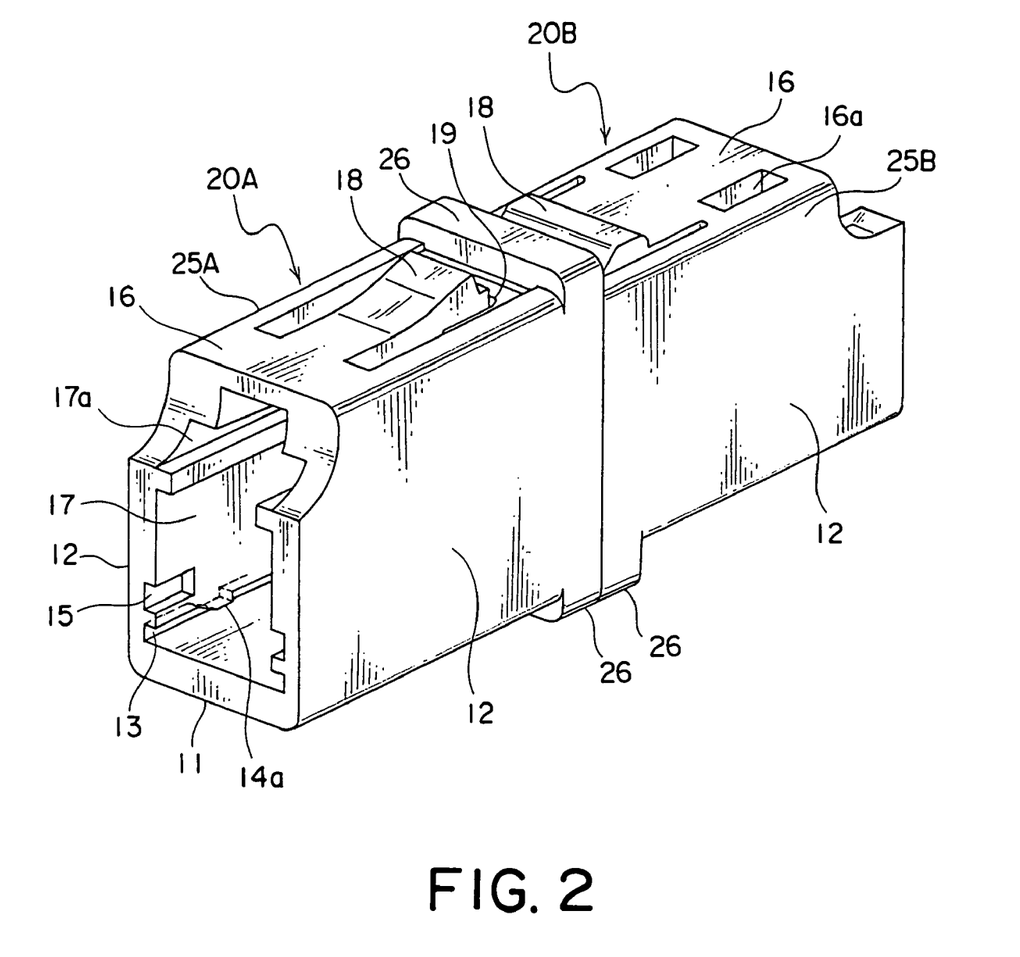
FIG. 2 is a perspective view of a housing of the optical adapter illustrated in FIG. 1 when it is butted against a housing of another optical adapter.

Referring to FIGS. 1 and 2, description will be made of an optical connection apparatus according to an embodiment of this invention. Herein, the optical connection apparatus is implemented as an optical adapter.

In FIG. 2, two optical adapters 20A and 20B have one ends butted to each other in an axial direction. The optical adapters 20A and 20B have the other ends adapted to receive optical plugs 60 illustrated in FIG. 1 and connected to optical fibers, respectively. Each of the optical plugs 60 has a ferrule 50 fitted to an end portion of the optical fiber. Inside the optical adapters 20A and 20B, the ferrules 50 are brought into contact with each other in the axial direction so that the optical fibers are optically connected to each other.

The optical adapter 20A has a box-like housing 25A having a rectangular section, forming an outer shell, and defining an optical axis of optical connection. Inside the housing 25A, a cylindrical holder (not shown) for receiving the ferrule 50 is formed at one end in the axial direction, i.e., a first end while an optical shutter 10 is fixed to the other end, i.e., a second end. The optical shutter 10 has a light shielding portion 1 positioned to obliquely cross the optical axis. Like the optical adapter 20A, the optical adapter 20B has a box-like housing 25B having a rectangular section, forming an outer shell, and defining an optical axis of optical connection. Inside the housing 25B, a cylindrical holder for receiving the ferrule 50 is formed at one end faced to the housing 25A while the optical shutter 10 is inserted to the other end. The above-mentioned structure is substantially similar to existing optical adapters except that the shutter 10 and a fixing structure thereof are different.

Each of the housings 25A and 25B has a top wall 16, a bottom wall 11, and opposite side walls 12 connecting one and the other sides of the top and the bottom walls 16 and 11, respectively. The housing 25A is provided with a pair of flanges 26 formed at the first end and protrude upward and downward from the upper wall 16 and the bottom wall 11, respectively. The top wall 16 is provided with an operating portion 18 for releasing or unlocking mutual coupling of the optical adapters 20A and 20B. Below the top wall 16, a plug guide groove 17a for guiding insertion of the optical plug 60 is formed.

The housing 25A defines a space having an opening 17 at the second end. In the space, the optical axis is positioned. At positions adjacent to the opening 17, a pair of guide portions 15 are formed on inner surfaces of the opposite side walls 12 as rectangular recesses. Below the guide portions 15, a pair of guide grooves 13 are formed to guide insertion of the shutter 10. The guide grooves 13 are formed on the inner surfaces of the opposite side walls 12 and extend along an inside surface of the bottom wall 11 in the axial direction from the opening 17 towards the first end. In each guide groove 13, protrusions 14a and 14b are formed on upper and lower parts thereof to prevent the shutter 10 from being released. Similarly, the housing 25B is provided with those elements corresponding to the guide portions 15, the guide grooves 13, the plug guide groove 17a, and the protrusions 14a and 14b.

The housing 25B is provided with a flange 26 only at a lower part of the one end faced to the housing 25A. The upper wall 16 of the housing 25B is provided with a locking member (not shown) for locking coupling with the optical adapter 20A.

In the following description, the optical adapters 20A and 20B may collectively be called an "optical adapter 20" if a particular one need not be specified. Similarly, the housings 25A and 25B may collectively be called a "housing 25" if a particular one need not be specified.

In FIG. 1, the optical plug 60 has a fitting portion 65 forming a housing or an outer shell to be fitted to the optical adapter 20, a holding portion 64 holding the ferrule 50 at its front part, an optical cable supporting portion 67 for holding an optical cable (not shown) having the optical fiber, a lever 62 formed at the fitting portion 65, and an operating portion 63. The holding portion 64 is urged forward by a coil spring 66. The spring 66 has one end supported by a cylindrical portion 68. The ferrule 50 has a forward end protruding forward from an opening of the fitting portion 65. An inclination angle formed by a line connecting a forward end face 51 of the ferrule 50 and a forward end portion 65a of the fitting portion 65 with respect to the axial direction or optical axis is greater than an inclination angle of the light shielding portion 1 of the shutter 10 with respect to the axial direction or optical axis.

In order to fit the above-mentioned optical plug 60 to the optical adapter 20, the optical plug 60 is moved in a direction depicted by an arrow 21. When the optical plug 60 is moved, the forward end portion 65a of the fitting portion 65 pushes down the light shielding portion 1 of the shutter 10 so that inclination of the light shielding portion 1 with respect to the optical axis is gradually reduced. At this time, the ferrule 50 is not brought into contact with the shutter 10 so that the forward end face 51 of the ferrule 50 as a part important in optical connection is not contaminated and that a light shielding surface of the light shielding portion 1 of the shutter 10 is not damaged. After completion of fitting of the optical plug 60 to the optical adapter 20, the light shielding portion 1 of the shutter 10 is displaced to a position deviated from the optical axis.

On the other hand, when the optical plug 60 is removed from the optical adapter 20, the light shielding portion 1 is returned by elastic restoring force to an original position, i.e., a position obliquely crossing the optical axis.

Referring to FIGS. 3 and 4A to 4D in addition, the shutter 10 will be described.

Figure 3:
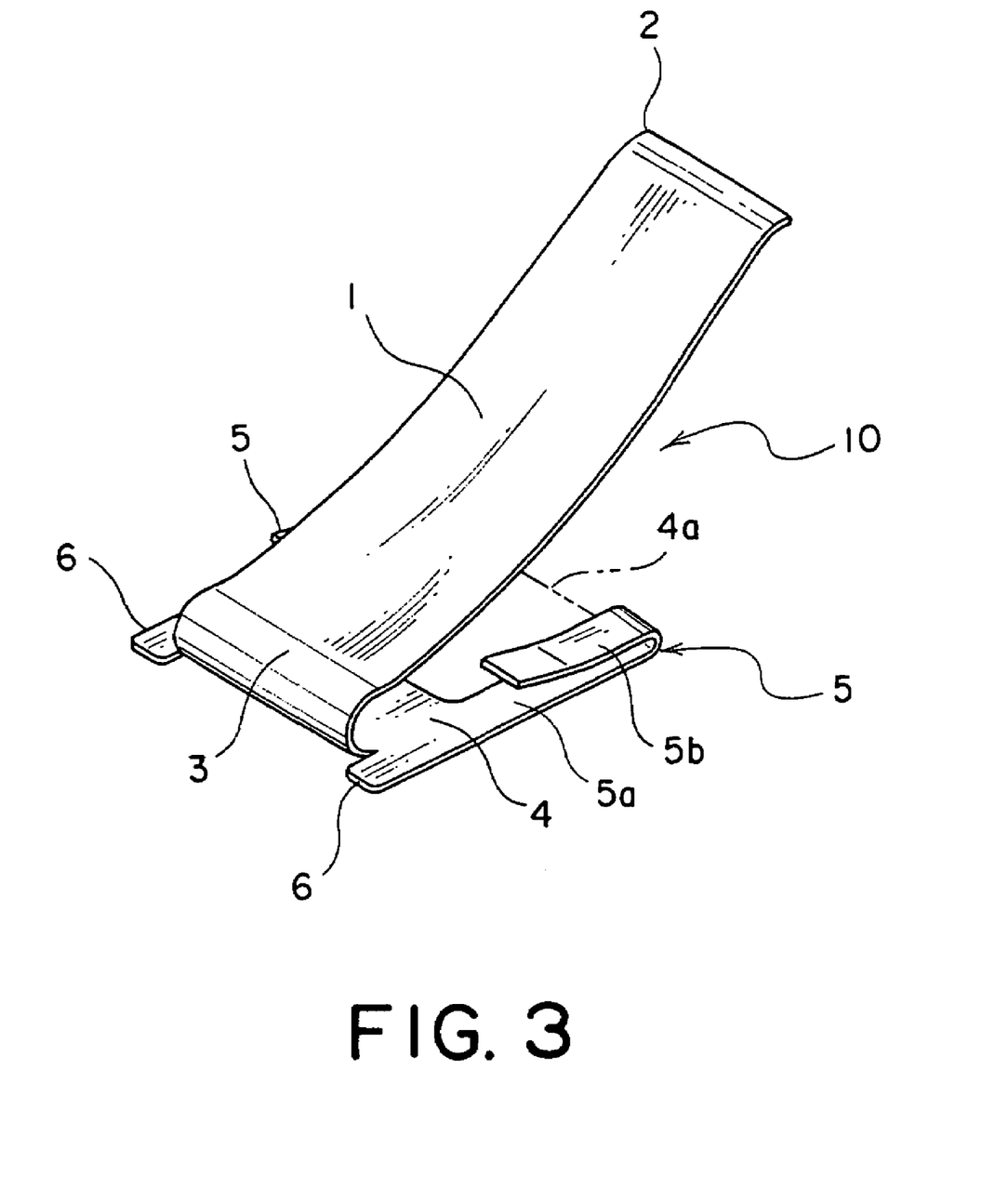
FIG. 3 is a perspective view of an example of a shutter used in the optical adapter illustrated in FIG. 1.
Figure 4A:
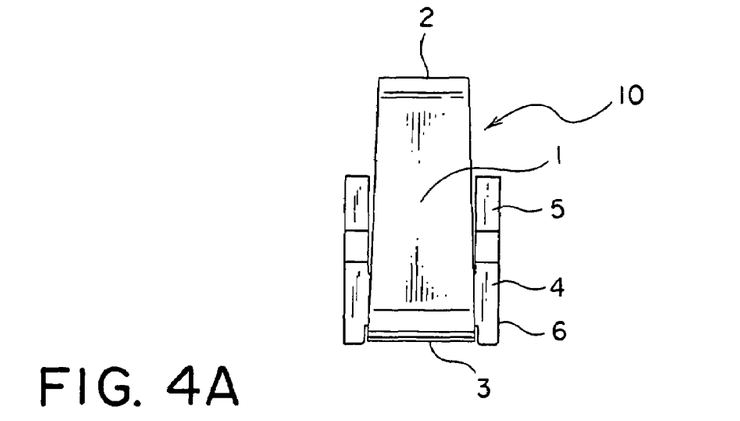
FIG. 4A is a top view of the shutter illustrated in FIG. 3.
Figure 4B:
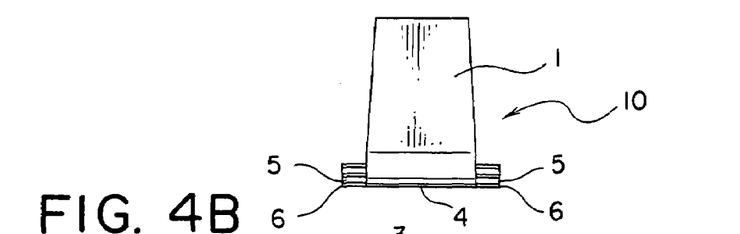
FIG. 4B is a front view of the shutter illustrated in FIG. 3.
Figure 4C:
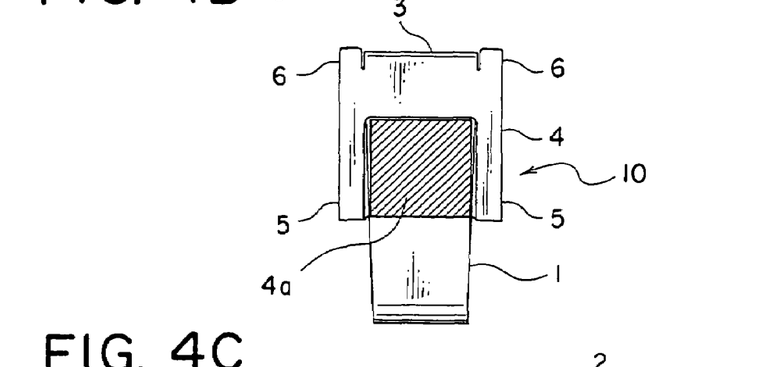
FIG. 4C is a bottom view of the shutter illustrated in FIG. 3.
Figure 4D:
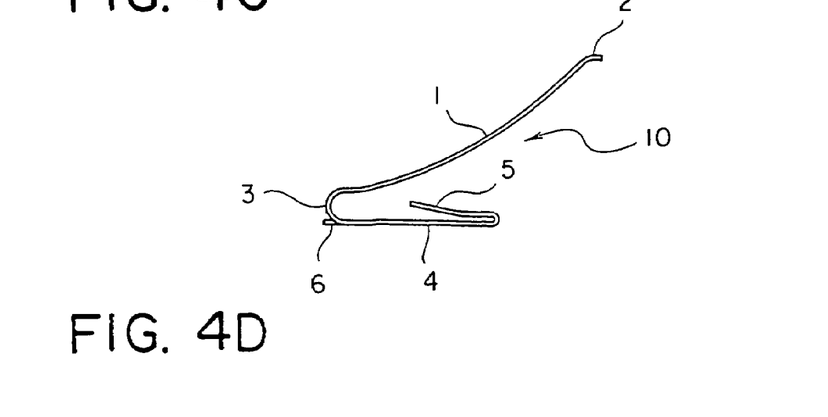
FIG. 4D is a side view of the shutter illustrated in FIG. 3.

In order to protect user's eyes, the shutter 10 is incorporated into the optical adapter 20. The shutter 10 is formed by press-working a single sheet of thin metal plate material having spring characteristics or elasticity. The shutter 10 has the light shielding portion 1 comprising a tapered rectangular plate portion having a width gradually narrowed towards an end thereof and adapted to shield light from the optical plug 60 (see FIG. 1) to be fitted to the optical adapter 20, an end rounded portion or an end R portion 2 formed at the end of the light shielding portion 1 to form a rounded shape, a base portion 3 having a U-shaped section and bent from the light shielding portion 1 in a rounded curved shape, a flat portion 4 extending rearward from a rear end of the base portion 3 to be brought into contact with an inner bottom surface of the optical adapter 20, a pair of locking portions 5 extending rearward from opposite sides of a rear end of the flat portion 4 and then folded back frontward to extend obliquely upward and forward to terminal ends thereof, and a pair of pressing portions 6 extending frontward from opposite sides of a front end of the flat portion 4.

The light shielding portion 1 has elasticity and is formed to be warped upward with an inclination with respect to the axial direction or an optical axis. Alternatively, the light shielding portion 1 may have a flat shape, a curved shape, or a combination thereof. The base portion 3 is folded back by 180° but may be folded back by an angle smaller than 180°, as will readily be understood. The flat portion 4 has a cut portion 4a (a hatched portion in FIG. 4C) between the locking portions 5. With this structure, an interference between the flat portion 4 and the light shielding portion 1 is prevented so that the optical adapter can be designed to be low in height. Each of the locking portions 5 has a parallel part 5a extending forward from the flat portion 4 in parallel thereto and an inclined part 5b extending from a terminal end of the parallel part 5a obliquely upward. Herein, the locking portions 5 may collectively be called a held portion. The pressing portions 6 are formed at extended ends of portions each of which is extended from the flat portion 4 towards a direction opposite to the parallel part 5a.

When the optical plug 60 is fitted to the optical adapter 20, the end of the light shielding portion 1 is rubbed or frictionally contacted by the optical plug 60. Taking this into consideration, the end of the light shielding portion 1 is provided with the end R portion 2 so as to remove an edge of the plate material from a part of the light shielding portion 1 to be contacted with the optical plug 60. Therefore, contact between the light shielding portion 1 and the optical plug 60 is smoothened to prevent the optical plug 60 from being damaged.

The width of the light shielding portion 1 and the position of the end thereof are designed so that an optical fiber of a mating optical plug can not be seen after the shutter 10 is incorporated. Specifically, when a user looks into the inside of the optical adapter 20 through an opening portion on the side provided with the shutter 10 in the state where the optical plug 60 is fitted to another opening portion of the optical adapter 20 on the side without the shutter 10, the end of the light shielding portion 1 is located at a position such that an end face of an optical fiber at the center of the ferrule 50 of the mating optical plug similar in structure to the optical plug 60. Likewise, the width of the light shielding portion 1 is sufficiently wide so that the end face of the optical fiber of the mating optical plug is not seen.

Figure 5A:
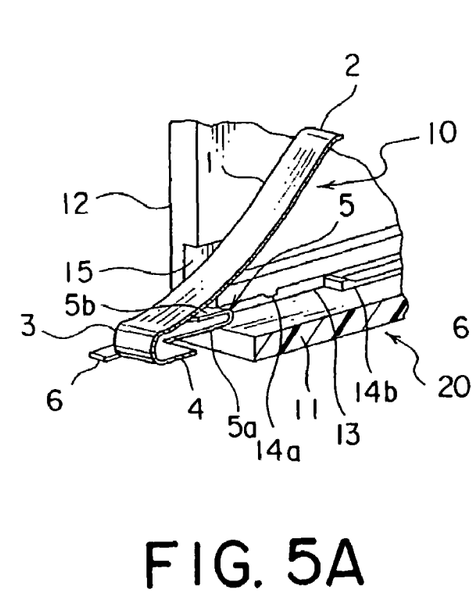
FIGS. 5A to 5C are views for describing a process of incorporating the shutter in FIG. 3 into the housing illustrated in FIG. 2.
Figure 5B:
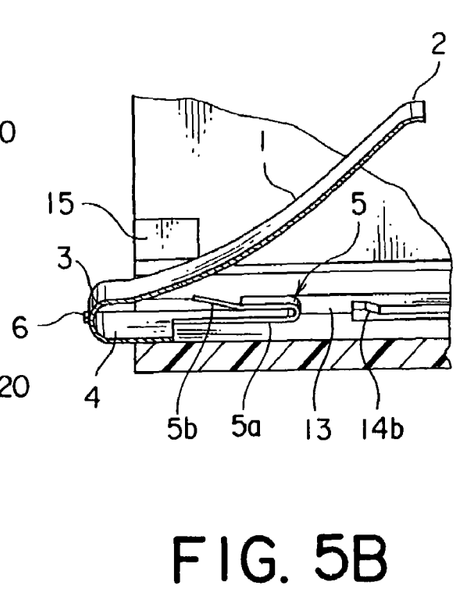
Figure 5C:
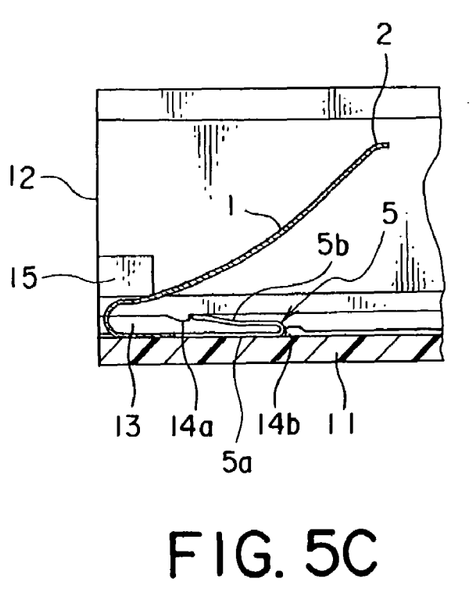

Referring to FIGS. 5A to 5C, description will be made of a process of incorporating the shutter 10 into the housing 25.

At first, as illustrated in FIG. 5A, the locking portions 5 of the shutter 10 are inserted into the guide grooves 13 on the opposite side walls 12 of the housing 25. Upon insertion of the shutter 10, the flat portion 4 is brought into contact with an inner wall of the housing 25. As a consequence, the shutter 10 is properly positioned as illustrated in FIG. 5B.

In the state illustrated in FIG. 5B, the pressing portions 6 exposed out of the housing 25 are pressed to move the light shielding portion 1 toward the inside of the housing 25. The locking portions 5 are guided by the guide grooves 13 and moved. When the shutter 10 advances, the inclined parts 5b pass over the protrusions 14a with elastic deformation of the locking portions 5.

After passing over the protrusions 14a, the inclined parts 5b of the locking portions 5 are brought into contact with ceiling surfaces of the guide grooves 13 by elastic restoring force. Simultaneously, insertion ends of the locking portions 5 are brought into contact with the protrusions 14b. As a consequence, as illustrated in FIG. 5C, the locking portions 5 are clamped by the protrusions 14a and 14b in the axial direction to be inhibited from forward and backward movement. Thus, incorporation of the shutter 10 is finished. In this state, the locking portions 5 are continuously applied with a preload and fixed to the housing 25 in a strained state. Therefore, the shutter 10 is prevented from being unstably wobbled.

When the shutter 10 is fixed to the housing 25, the pressing portions 6 are finally pushed inward. Thus, the shutter 10 can be incorporated without contacting the light shielding portion 1. It is therefore possible to prevent deformation of the light shielding portion 1 due to incorporation of the shutter 10.

As a result of incorporation by pressing the pressing portions 6, the light shielding portion 1 can be located at a position apart from the opening 17 of the housing 25. Therefore, guide means for fitting the optical plug 60 can be formed in the vicinity of the opening 17 of the housing 25.

Figure 6A:
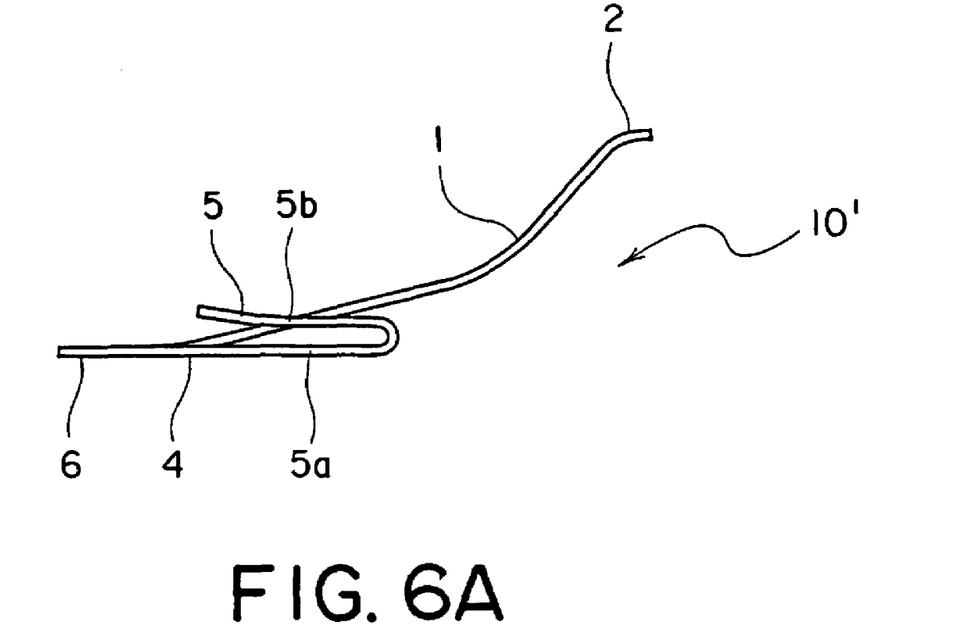
FIG. 6A is a side view of another example of the shutter used in the optical adapter illustrated in FIG. 1.
Figure 6B:
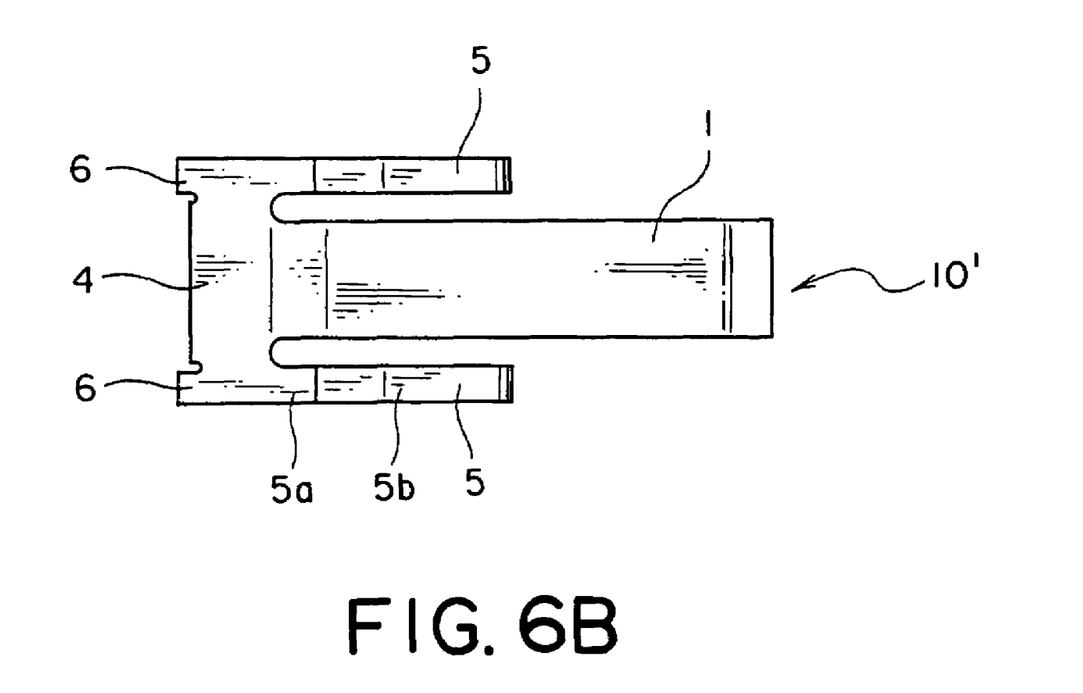
FIG. 6B is a top view of the shutter illustrated in FIG. 6A.

Referring to FIGS. 6A and 6B, description will be made of another example of the shutter which can be used with the optical adapter 20 illustrated in FIG. 2.

In FIGS. 6A and 6B, a shutter 10' is formed by press-working a single metal plate having spring characteristics or elasticity. The shutter 10' comprises a light shielding portion 1 formed by a rectangular plate material bent via a folding portion 17 slightly upward to form an obtuse angle, an end R portion 2 formed at an end of the light shielding portion 1 to form an R shape, a flat portion 4 connected to a base portion of the light shielding portion 1, a pair of locking portions 5 extending rearward from opposite sides of the flat portion 4 and then folded back frontward to extend forward, and a pair of pressing portions 6 extending forward from the opposite sides of the flat portion 4. Each of the locking portions 5 has a parallel part 5a extending forward from the bent portion in parallel to the flat portion 4 and an inclined part 5b extending from a terminal end of the parallel part 5a obliquely upward.

The shutter 10' is incorporated into the optical adapter 20 in the manner similar to that described in connection with FIGS. 5A to 5C. At this time, since the pressing portions 6 are pressed, the light shielding portion 1 is prevented from being deformed. As a result of incorporation by pressing the pressing portions 6, the light shielding portion 1 can be located at an intermediate position of the space in the optical adapter in the axial direction. Therefore, guide means for guiding the optical plug can be formed in the vicinity of the opening of the optical adapter.

Each of the above-mentioned shutters 10 and 10' is locked to the housing 25 of the optical adapter 20 by the use of elasticity and can be incorporated without requiring a special tool. Thus, it is easy to attach each of the shutters 10 and 10' to the optical adapter 20.

Although this invention has been described in conjunction with the preferred embodiment thereof, this invention may be modified in various other manners within the scope of the appended claims. In the foregoing description, this invention is implemented in the optical adapter used for connection of the optical connector as a connection assisting element or device. However, it will readily be understood that this invention is similarly implemented in an ordinary optical connector such as an optical plug and an optical receptacle.

What is claimed is:

1. An optical connection apparatus for use in optical connection, the optical connection apparatus comprising:
   a housing defining an optical axis of the optical connection; and
   a shutter formed by a single sheet of plate material and held by the housing;
   wherein the shutter comprises:
      a held portion held by the housing;
      a plate-like light shielding portion which extends from the held portion in a given direction to be positioned to cross the optical axis, and which has a width in a direction that is perpendicular to the optical axis and to the given direction; and
      a pressing portion formed to be continuous from the held portion;
   wherein the held portion comprises a pair of locking portions spaced from each other in the direction of the width, and each of the locking portions includes a free end, the free ends of the locking portions being spaced apart from and not connected to each other;
   wherein the light shielding portion is located at a position corresponding to a space between the locking portions, and the held portion is located outside of the width of the light shielding portion in the direction of the width; and
   wherein the housing has an opening on the optical axis, and the pressing portion is provided at a position corresponding to the opening to be exposed out of the housing.

2. The optical connection apparatus according to claim 1, wherein the locking portions are locked to the housing in the direction of the optical axis.

3. The optical connection apparatus according to claim 2, wherein the housing comprises a pair of grooves extending in the direction of the optical axis, and the locking portions are inserted into the grooves, respectively.

4. The optical connection apparatus according to claim 3, wherein the grooves are provided with protrusions which lock the locking portions in the direction of the optical axis.

5. The optical connection apparatus according to claim 1, wherein the shutter further comprises:
   a base portion formed in a curved shape at the position corresponding to the opening to be continuous from the light shielding portion; and a flat portion extending from the base portion to inside of the housing.

6. The optical connection apparatus according to claim 5, wherein the housing defines on the optical axis a space connected to the opening, and the light shielding portion extends from the base portion into the space to be inclined with respect to the optical axis.

7. The optical connection apparatus according to claim 6, wherein the light shielding portion is movable to a position deviated from the optical axis by elasticity of the shutter.

8. A shutter for an optical connection apparatus used for connection of an optical fiber, the shutter being formed by a single sheet of plate material, the shutter including:
   a plate-like light shielding portion which extends in a given direction to cross outgoing light emitted from the optical fiber so as to shield the outgoing light;
   a held portion, which is adapted to be held by a housing of the optical connection apparatus, and which comprises a pair of locking portions which are connected to the light shielding portion and each of which includes a free end, the free ends of the locking portions being spaced apart from and not connected to each other, wherein the locking portions are spaced from each other so as to be located outside of a width of the light shielding portion in a direction which is perpendicular to the outgoing light and to the given direction; and
   a pressing portion formed to be continuous from the held portion and to be exposed out of the housing of the optical connection apparatus;
   wherein the light shielding portion is located at a position corresponding to a space between the locking portions.

9. The shutter according to claim 8, further comprising a flat portion between the light shielding portion and the locking portions, the flat portion having a cut portion corresponding to the space between the locking portions.

10. The shutter according to claim 9, further comprising a base portion formed in a curved shape between the light shielding portion and the flat portion.

11. The optical connection apparatus according to claim 1, wherein the light shielding portion is longer than the locking portions.

12. The shutter according to claim 8, wherein the light shielding portion is longer than the locking portions.

* * * * *